(12) United States Patent
Zhang et al.

(10) Patent No.: US 11,037,691 B2
(45) Date of Patent: Jun. 15, 2021

(54) ELECTRICALLY CONDUCTIVE MATERIAL, PRINTING INK AND METHOD FOR MANUFACTURING ELECTRICALLY CONDUCTIVE STRUCTURE

(71) Applicants: BOE TECHNOLOGY GROUP CO., LTD., Beijing (CN); HEFEI BOE DISPLAY TECHNOLOGY CO., LTD., Anhui (CN)

(72) Inventors: Xingfu Zhang, Beijing (CN); Wei Zhang, Beijing (CN); Chaoyue Wang, Beijing (CN)

(73) Assignees: BOE TECHNOLOGY GROUP CO., LTD., Beijing (CN); HEFEI BOE DISPLAY TECHNOLOGY CO., LTD., Hefei (CN)

(*) Notice: Subject to any disclaimer, the term of this patent is extended or adjusted under 35 U.S.C. 154(b) by 13 days.

(21) Appl. No.: 16/145,409

(22) Filed: Sep. 28, 2018

(65) Prior Publication Data
US 2019/0103199 A1    Apr. 4, 2019

(30) Foreign Application Priority Data

Sep. 30, 2017  (CN) .......................... 201710919811.5

(51) Int. Cl.
| | |
|---|---|
| *B41J 11/00* | (2006.01) |
| *H01B 1/02* | (2006.01) |
| *C09D 11/52* | (2014.01) |
| *C09D 11/36* | (2014.01) |
| *C09D 11/322* | (2014.01) |

(52) U.S. Cl.
CPC .............. *H01B 1/02* (2013.01); *B41J 11/002* (2013.01); *C09D 11/322* (2013.01); *C09D 11/36* (2013.01); *C09D 11/52* (2013.01)

(58) Field of Classification Search
CPC ...... B41J 11/002; C09D 11/322; C09D 11/36; C09D 11/52; H01B 1/02
See application file for complete search history.

(56) References Cited

U.S. PATENT DOCUMENTS

2017/0194074 A1    7/2017  Sohn et al.

FOREIGN PATENT DOCUMENTS

| CN | 103586456 A | 2/2014 |
|---|---|---|
| CN | 104130628 A | 11/2014 |
| CN | 105632588 A | 6/2016 |
| CN | 106623963 A | 7/2017 |
| CN | 106941019 A | 7/2017 |

OTHER PUBLICATIONS

The First Chinese Office Action dated Nov. 5, 2018; Appln. No. 201710919811.5.

*Primary Examiner* — Lamson D Nguyen

(57) ABSTRACT

The present disclosure provides an electrically conductive material, a printing ink and a method for manufacturing an electrically conductive structure. The electrically conductive material includes a plurality of electrically conductive metal nanoplates and electrically conductive metal nanoparticles filled in gaps between the plurality of the electrically conductive metal nanoplates.

19 Claims, 4 Drawing Sheets

100

100

ELECTRICALLY CONDUCTIVE MATERIAL, PRINTING INK AND METHOD FOR MANUFACTURING ELECTRICALLY CONDUCTIVE STRUCTURE

The present application claims the priority of the Chinese Patent Application No. 201710919811.5 filed on Sep. 30, 2017, which is incorporated herein by reference as part of the disclosure of the present application.

TECHNICAL FIELD

Embodiments of the present disclosure relate to an electrically conductive material, a printing ink and a method for manufacturing an electrically conductive structure.

BACKGROUND

In the process of manufacturing electronic devices by traditional methods, an electrically conductive structure is mainly prepared by a photolithography method, a vacuum deposition method or a chemical plating method. However, in a case that the electrically conductive structure is manufactured by the above methods, equipments are expensive, the manufacture process is complex, and raw materials pollute the environment, which cannot meet the current requirements for manufacturing the electronic devices. With the development of electronic information technology, there is an urgent need for a low cost, easy-to-operate and environmentally friendly preparation technology of an electrically conductive film.

At present, printing ink is widely used in inkjet printing, stencil printing, gravure printing, relief printing process and other processes. For example, by using the above processes, an electrically conductive structure with an excellent transmission property, an excellent dielectric property, an excellent optical property and an excellent mechanical property may be formed of the printing ink.

SUMMARY

At least one embodiment of the present disclosure provides an electrically conductive material, and the electrically conductive material comprises: a plurality of electrically conductive metal nanoplates and electrically conductive metal nanoparticles filled in gaps between the plurality of the electrically conductive metal nanoplates.

For example, in the electrically conductive material provided by at least one embodiment of the present disclosure, each of the electrically conductive metal nanoplates comprises a first surface and a second surface opposite to each other, and a minimum distance between the first surface and the second surface is at a nanometer scale; the first surface of each of the electrically conductive metal nanoplates has a first size along a first direction and a second size along a second direction, the first direction is different from the second direction, and both the first size and the second size are more than three times the minimum distance; and the second surface of each of the electrically conductive metal nanoplates has a third size along a third direction and a fourth size along a fourth direction, the third direction is different from the fourth direction, and both the third size and the fourth size are more than three times the minimum distance.

For example, in the electrically conductive material provided by at least one embodiment of the present disclosure, a size of each of the electrically conductive metal nanoparticles in any direction is at a nanometer scale.

For example, in the electrically conductive material provided by at least one embodiment of the present disclosure, a shape of each of the electrically conductive metal nanoplates comprises an irregular polygon.

For example, in the electrically conductive material provided by at least one embodiment of the present disclosure, a shape of each of the electrically conductive metal nanoplates comprises at least one selected from the group consisting of a triangle, a quadrilateral, a pentagon and a hexagon.

For example, in the electrically conductive material provided by at least one embodiment of the present disclosure, a maximum size of the first surface of each of the electrically conductive metal nanoplates is from 3 times to 5 times an average diameter of the electrically conductive metal nanoparticles.

For example, in the electrically conductive material provided by at least one embodiment of the present disclosure, a maximum size of the second surface of each of the electrically conductive metal nanoplates is from 3 times to 5 times an average diameter of the electrically conductive metal nanoparticles.

For example, in the electrically conductive material provided by at least one embodiment of the present disclosure, both a material of the electrically conductive metal nanoplates and a material of the electrically conductive metal nanoparticles comprise at least one selected from the group consisting of gold, silver, copper, aluminum and platinum.

For example, in the electrically conductive material provided by at least one embodiment of the present disclosure, the material of the electrically conductive metal nanoplates is the same as the material of the electrically conductive metal nanoparticles.

For example, in the electrically conductive material provided by at least one embodiment of the present disclosure, a mass percentage of the electrically conductive metal nanoplates is larger than a mass percentage of the electrically conductive metal nanoparticles.

At least one embodiment of the present disclosure further provides a printing ink, the printing ink comprises any one of the above-mentioned electrically conductive materials and an organic solvent, and the any one of the above-mentioned electrically conductive materials is dispersed in the organic solvent.

For example, in the printing ink provided by at least one embodiment of the present disclosure, a mass percentage of the electrically conductive material is from 8% to 15%, and a mass percentage of the organic solvent is from 85% to 92%.

For example, the printing ink provided by at least one embodiment of the present disclosure further comprises a dispersant and an additive.

For example, in the printing ink provided by at least one embodiment of the present disclosure, the organic solvent comprises ethanol, the dispersant comprises polyvinylpyrrolidone, and the additive comprises at least one selected from the group consisting of glycol and glycerol.

For example, in the printing ink provided by at least one embodiment of the present disclosure, each of the electrically conductive metal nanoplates comprises a first surface and a second surface opposite to each other, and a minimum distance between the first surface and the second surface is at a nanometer scale; the first surface of each of the electrically conductive metal nanoplates has a first size along a first direction and a second size along a second direction, the first direction is different from the second direction, and both the first size and the second size are more than three times the minimum distance; and the second surface of each of the electrically conductive metal nanoplates has a third size along a third direction and a fourth size along a fourth direction, the third direction is different from the fourth direction, and both the third size and the fourth size are more than three times the minimum distance.

At least one embodiment of the present disclosure further provides a method for manufacturing an electrically conductive structure, and the manufacturing method comprises: providing a base substrate; and forming any one of the above-mentioned printing inks on the base substrate by an inkjet printing method to form the electrically conductive structure.

For example, the manufacturing method provided by at least one embodiment of the present disclosure further comprises: drying the printing ink.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure.

DETAILED DESCRIPTION

Figure 1:
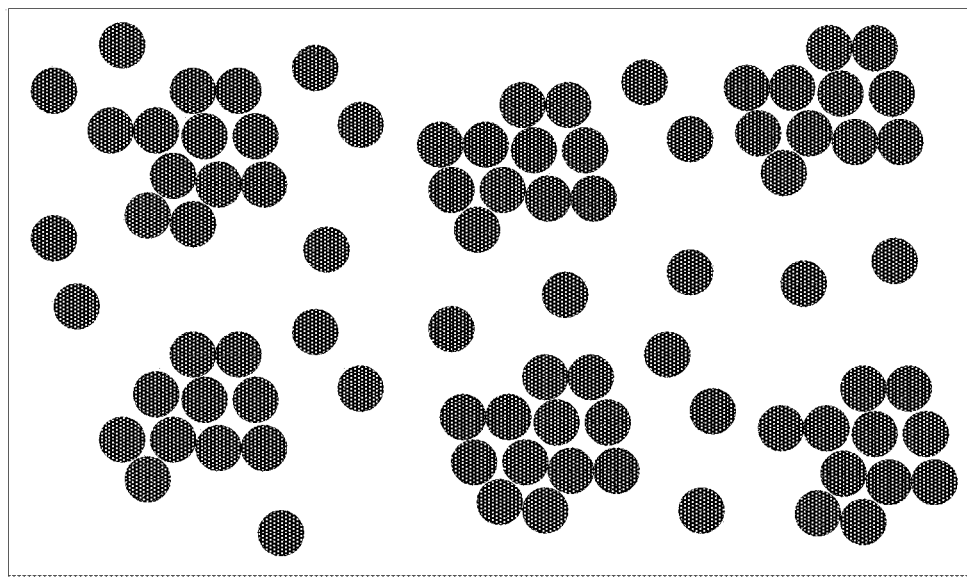
FIG. 1 is a schematic diagram of a planar structure of a printing ink made from silver nanoparticles.

In order to make objects, technical details and advantages of embodiments of the disclosure clear, the technical solutions of the embodiments will be described in a clearly and fully understandable way in connection with the related drawings. It is apparent that the described embodiments are just a part but not all of the embodiments of the disclosure. Based on the described embodiments herein, those skilled in the art can obtain, without any inventive work, other embodiment(s) which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and claims of the present application, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or mechanical connection, but may comprise an electrical connection which is direct or indirect. The terms "on," "under," "right," "left" and the like are only used to indicate relative position relationship, and in the case that the position of an object is described as being changed, the relative position relationship may be changed accordingly.

At present, in a process of manufacturing an electronic product, for example, an inkjet printing technology is used for achieving an ultra-narrow circuit design and printing an electrode. A functional material is deposited on a base substrate directly by the inkjet printing process to form the circuit and the electrode. For example, in the process of manufacturing an organic light-emitting device (OLED), a printing ink is directly printed as an electrically conductive circuit, or the printing ink is directly printed as a transparent electrode of the OLED. The printing ink at a nanometer scale is printed on the base substrate at one time by an inkjet printing device, and a printable line width is less than 10 microns, for example, a line at a sub-micron scale or a line at a nanometer scale is formed. In addition, the inkjet printing technology significantly reduces the amount of raw materials, increases the production efficiency, and reduces the production cost. With an emergence of nano-inkjet printing technology, research on metal particles which are able to be applied to inkjet printing is getting deeper and deeper. For example, a metal-based printing ink mainly uses an electrically conductive metal as an electrically conductive filler of the ink, for example, the electrically conductive metal comprises Ag, Cu, Au, or Al, etc.

For example, an electrically conductive structure (for example, a circuit or an electrode, etc.) is used in a radio frequency identification (RFID), a printed circuit board (PCB), a flexible printed circuit board (FPCB) and so on.

Because electronic products and data communication devices have increasing demands for light-weight and thinning, high integration and low production costs, a regular printing ink cannot meet the requirements of technological development. A nano-printing ink is widely used in the field of electronic information technology because of its good conductivity, low sintering temperature and low production cost. In addition, according to different requirements, desired electrically conductive patterns can be made from the nano-printing ink by using the inkjet printing method, and used for manufacturing various semiconductor devices, optoelectronic devices and other novel electronic devices.

For example, an electrically conductive material of the printing ink mainly comprises an electrically conductive metal nanoparticle or an electrically conductive metal nanowire, for example, a silver nanoparticle or a silver nanowire. In a case that electrically conductive metal nanoparticles are used as a single filling material of the printing ink, the electrically conductive metal nanoparticles are prone to aggregation. A large number of protective agent, such as polyvinyl pyrrolidone (PVP) requires to be added to the printing ink to prevent the electrically conductive metal nanoparticles from aggregating. The PVP having insulating property is adsorbed on surfaces of the electrically conductive metal nanoparticles and prevents the formation of electrically conductive paths. At the same time, removing the large number of PVP coated on the surfaces of the electrically conductive metal nanoparticles requires a higher sintering temperature and a longer sintering time. In addition, after the PVP between the electrically conductive metal nanoparticles is removed, a porosity of the printing ink after being sintered becomes larger, and a compactness of the printing ink after being sintered becomes worse, thus the conductivity and the mechanical strength of the formed electrically conductive structure are affected. In a case that electrically conductive metal nanowires are used as the single filling material of the printing ink, despite of its high electrical conductivity, the manufacturing process of the electrically conductive metal nanowires is complex, and the manufacturing process requires a high requirement for equipment and a high production cost.

Figure 2:
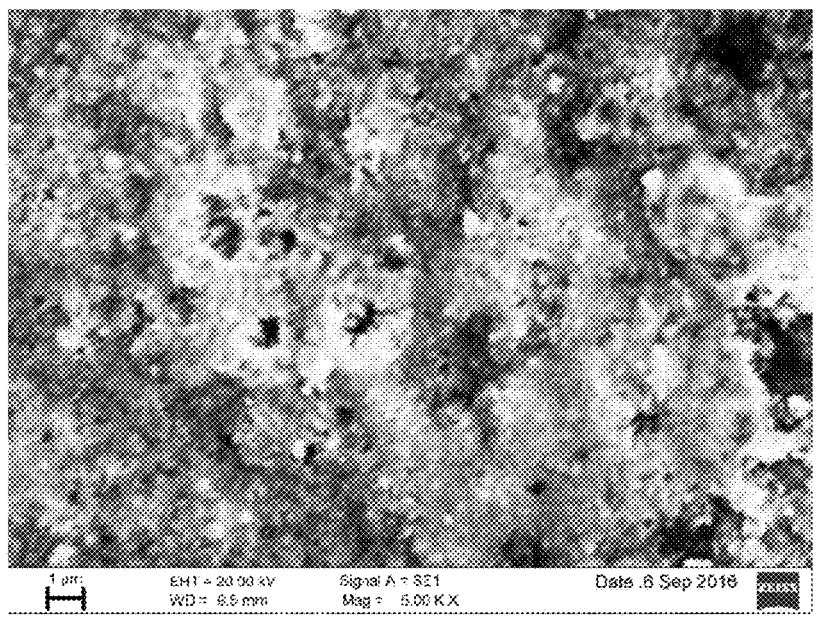
FIG. 2 is a scanning electron microscope diagram of the printing ink made from the silver nanoparticles in FIG. 1 after being sintered.

For example, FIG. 1 is a schematic diagram of a planar structure of a printing ink made from silver nanoparticles. As illustrated in FIG. 1, an agglomeration phenomenon of silver nanoparticles is serious. For example, FIG. 2 is a scanning electron microscope diagram of the printing ink made from silver nanoparticles in FIG. 1 after being sintered. As illustrated in FIG. 2, the porosity of the printing ink that the silver nanoparticles used as the filler becomes larger after the printing ink being sintered, that is to say, larger gaps and more holes are formed after the printing ink being sintered, and the silver nanoparticles are loosely distributed. The electrically conductive structure made of the printing ink seriously affects its electrical conductivity.

The inventors of the present disclosure find that a dispersity of the electrically conductive metal nanoplates is good, the electrically conductive metal nanoplates are not prone to agglomerate, and its preparation cost is low, thus, the electrically conductive metal nanoplates are able to be used as frameworks. Electrically conductive metal nanoparticles are filled in gaps between the electrically conductive metal nanoplates. In this way, the electrically conductive material having a compact structure and a good electrical conductivity can be obtained by using the electrically conductive metal nanoplates as frameworks and filling the electrically conductive metal nanoparticles in the gaps between the electrically conductive metal nanoplates. In a case that the electrically conductive material is used in the printing ink, the mechanical strength of the printed circuit formed subsequent is increased, an electrically conductive path of the printing ink is wider and more continuous, and the production cost is reduced.

Figure 3:
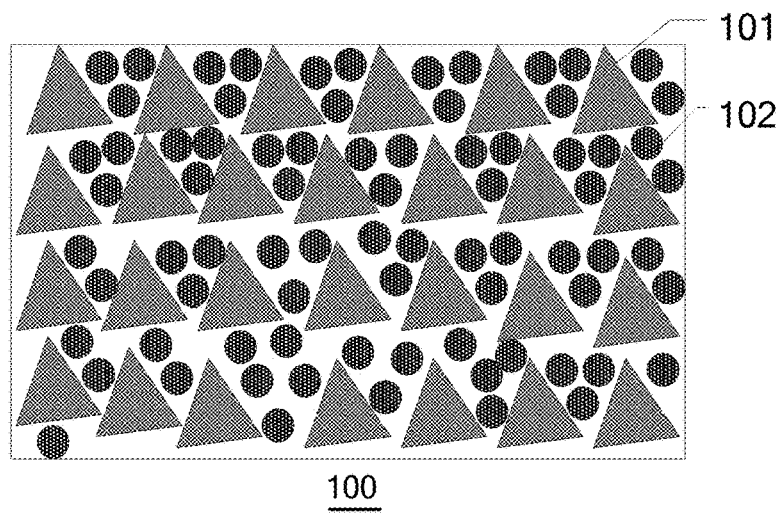
FIG. 3 is a schematic diagram of a planar structure of a printing ink formed by compounding triangular electrically conductive metal nanoplates with electrically conductive metal nanoparticles provided by at least one embodiment of the present disclosure.

At least one embodiment of the present disclosure provides an electrically conductive material, for example, FIG. 3 is a schematic diagram of a planar structure of a printing ink formed by compounding triangular electrically conductive metal nanoplates with electrically conductive metal nanoparticles provided by at least one embodiment of the present disclosure. The electrically conductive material 100 comprises: a plurality of electrically conductive metal nanoplates 101 and electrically conductive metal nanoparticles 102 filled in gaps between the plurality of the electrically conductive metal nanoplates 101. Because the electrically conductive metal nanoplates have relatively good electrical conductivity, the preparation cost of the electrically conductive metal nanoplates is low, and the electrically conductive metal nanoplates are not prone to agglomerate, in this way, a compact structure can be obtained by using the electrically conductive metal nanoplates as frameworks and filling the electrically conductive metal nanoparticles in gaps between the electrically conductive metal nanoplates, thus, the electrically conductivity of the electrically conductive material is increased and the preparation cost is reduced.

For example, taking the electrically conductive material made from silver nanoplates and silver nanoparticles as an example, the test result shows that a square resistance of a composite electrically conductive material made from the silver nanoplates and the silver nanoparticles is $\frac{1}{10}$ of a square resistance of the electrically conductive material made from only the silver nanoparticles.

For example, in the electrically conductive material provided by at least one embodiment of the present disclosure, each of the electrically conductive metal nanoplates comprises a first surface and a second surface opposite to each other, and a minimum distance between the first surface and the second surface is at a nanometer scale. The first surface of each of the electrically conductive metal nanoplates has a first size along a first direction and a second size along a second direction, the first direction is different from the second direction, and both the first size and the second size are more than three times the minimum distance. The second surface of each of the electrically conductive metal nanoplates has a third size along a third direction and a fourth size along a fourth direction, the third direction is different from the fourth direction, and both the third size and the fourth size are more than three times the minimum distance.

Figure 3A:
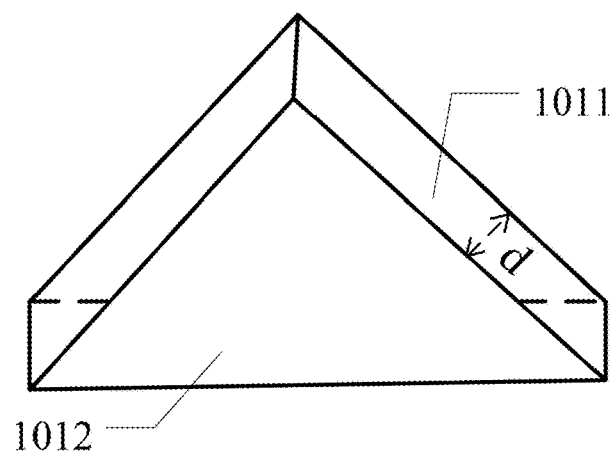
FIGS. 3A and 3B are structural schematic diagrams of one of the triangular electrically conductive metal nanoplates in FIG. 3 respectively.
Figure 3B:
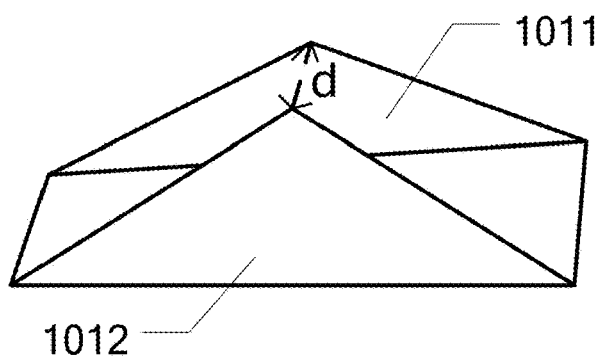

For example, the electrically conductive material made from triangular electrically conductive metal nanoplates is taken as an example. FIGS. 3A and 3B are structural schematic diagrams of one of the triangular electrically conductive metal nanoplates in FIG. 3 respectively. The minimum distanced between the first surface 1011 and the second surface 1012 is a minimum vertical distance between the first surface 1011 and the second surface 1012.

It should be noted that, the first surface and the second surface opposite to each other are not required to be completely parallel to each other, and the first surface and the second surface are able to be extended to form an angle between the two surfaces.

As illustrated in FIG. 3A, the first surface 1011 is parallel to the second surface 1012, and the minimum distanced between the first surface 1011 and the second surface 1012 is a vertical distance between the first surface 1011 and the second surface 1012.

As illustrated in FIG. 3B, the first surface 1011 is not parallel to the second surface 1012, an angle is formed between the first surface 1011 and the second surface 1012. The minimum distance d between the first surface 1011 and the second surface 1012 is the minimum vertical distance between the first surface 1011 and the second surface 1012.

For example, the first direction is the same as or different from the third direction, and the second direction is the same as or different from the fourth direction.

For example, in the electrically conductive material provided by at least one embodiment of the present disclosure, a size of each of the electrically conductive metal nanoparticles in any direction is at the nanometer scale.

For example, the nanometer scale refers to a size ranging from 1 nm to 100 nm.

For example, in one example, the first size, the second size, the third size and the fourth size of each of the electrically conductive metal nanoplates are all at the nanometer scale. For example, a vertical distance between the first surface and the second surface of the electrically conductive metal nanoplate is approximately 5 nm, 10 nm, 15 nm, 20 nm, 25 nm, or 30 nm, etc. The first size, the second size, the third size and the fourth size of each of the electrically conductive metal nanoplates are approximately 30 nm, 40 nm, 45 nm, 60 nm, 75 nm, or 90 nm, etc.

For example, in another example, at least one of the first size, the second size, the third size and the fourth size of each of the electrically conductive metal nanoplates is not at the nanometer scale. For example, the vertical distance between the first surface and the second surface of the electrically conductive metal nanoplate is approximately 10 nm, 20 nm, 30 nm, 40 nm, 50 nm or 60 nm, etc., and the first size, the second size, the third size and the fourth size of each of the electrically conductive metal nanoplates are approximately 60 nm, 75 nm, 90 nm, 120 nm, 135 nm, 150 nm, 160 nm, 180 nm, or 200 nm, etc.

For example, a shape of each of the electrically conductive metal nanoplates comprises an irregular polygons, the number of edges of the polygons is not limited.

For example, the shape of each of the electrically conductive metal nanoplates comprises at least one selected from the group consisting of a regular triangle, a regular quadrilateral, a regular pentagon and a regular hexagon. For example, the shape of the electrically conductive metal nanoplate is an equilateral triangle, an isosceles triangle, a right triangle, a parallelogram, a rectangle, a trapezoid, a regular pentagon, a regular hexagon, or a regular octagon, etc.

Figure 4:
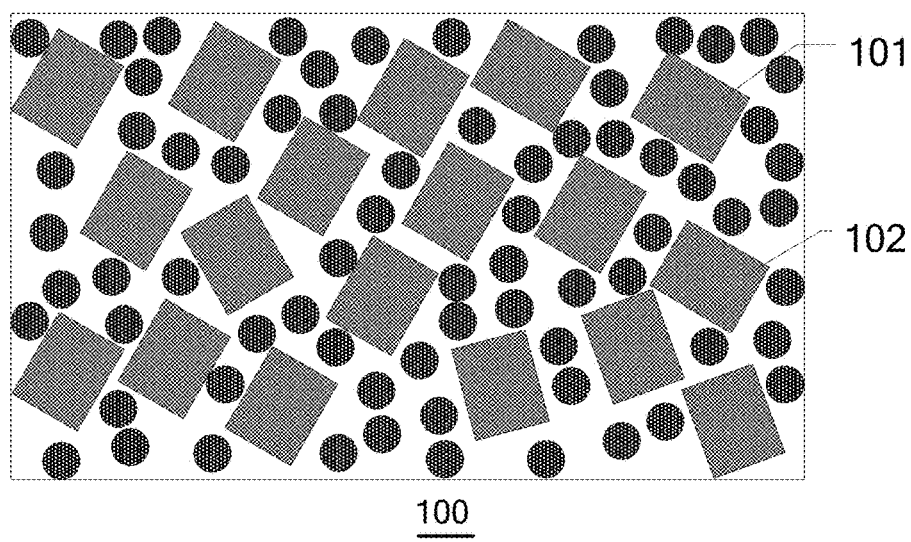
FIG. 4 is a schematic diagram of a planar structure of a printing ink formed by compounding quadrilateral electrically conductive metal nanoplates and electrically conductive metal nanoparticles provided by at least one embodiment of the present disclosure.

For example, FIG. 4 is a schematic diagram of a planar structure of a printing ink formed by compounding quadrilateral electrically conductive metal nanoplates with electrical conductive metal nanoparticles provided by at least one embodiment of the present disclosure. As illustrated in FIG. 4, the quadrilateral electrically conductive metal nanoplates are used as the frameworks, electrically conductive metal nanoparticles are filled in gaps between the electrically conductive metal nanoplates to obtain the compact structure.

For example, the shape of each of the electrically conductive metal nanoplates comprises an irregular polygons. For example, at least one of the edges of the polygons is a zigzag or a curve.

Figure 5:
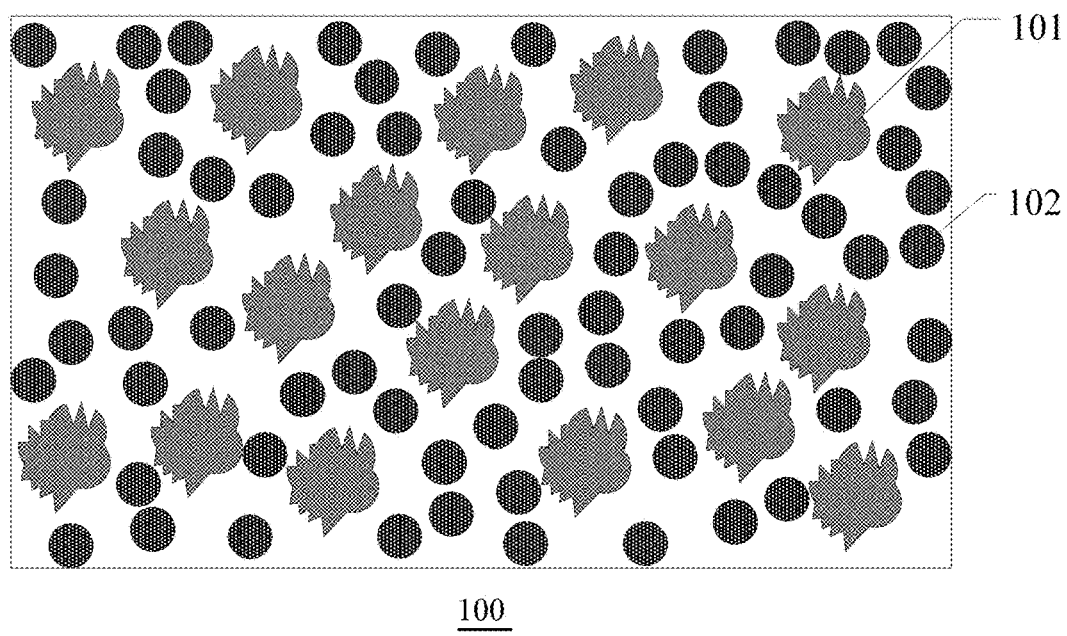
FIG. 5 is a schematic diagram of a planar structure of a printing ink formed by compounding irregular polygonal electrically conductive metal nanoplates and electrically conductive metal nanoparticles provided by at least one embodiment of the present disclosure.

For example, FIG. 5 is a schematic diagram of a planar structure of a printing ink formed by compounding irregular polygonal electrically conductive metal nanoplates and electrically conductive metal nanoparticles provided by at least one embodiment of the present disclosure. As illustrated in FIG. 5, the irregular polygon comprises a zigzag shape edge and a curved edge at the same time. FIG. 5 only exemplarily illustrates the shape of the irregular polygon, for example, the shapes of the irregular polygon are any other irregular shapes.

For example, a maximum size of the first surface of each of the electrically conductive metal nanoplates 101 is 3 times to 5 times an average diameter of the electrically conductive metal nanoparticles 102, for example, 3 times, 3.5 times, 4 times, 4.5 times, or 5 times, etc.

For example, a maximum size of the second surface of each of the electrically conductive metal nanoplates 101 is 3 times to 5 times an average diameter of the electrically conductive metal nanoparticles 102. For example, 3 times, 3.5 times, 4 times, 4.5 times, or 5 times, etc.

It should be noted that, the maximum size of the first surface is a longest linear distance on the first surface, that is, a maximum distance between any two points at the edges of the first surface; the maximum size of the second surface is a longest linear distance on the second surface, that is, a maximum distance between any two points at the edges of the second surface.

For example, the maximum size of the first surface of each of the electrically conductive metal nanoplates 101 is from 30 nm to 200 nm, and the average diameter of electrically conductive metal nanoparticles is from 6 nm to 60 nm.

For example, the maximum size of the second surface of each of the electrically conductive metal nanoplates 101 is from 30 nm to 200 nm, and the average diameter of electrically conductive metal nanoparticles is from 6 nm to 60 nm.

For example, in one example, the maximum size of the first surface of each of the electrically conductive metal nanoplates 101 is approximately 30 nm, 40 nm, 45 nm, 60 nm, 75 nm, or 90 nm, etc., and the average diameter of the electrically conductive metal nanoparticles 102 is approximately 6 nm, 8 nm, 10 nm, 20 nm, 25 nm, or 30 nm, etc.

For example, in another example, the maximum size of the second surface of each of the electrically conductive metal nanoplates 101 is approximately 30 nm, 40 nm, 45 nm, 60 nm, 75 nm, or 90 nm, etc., and the average diameter of the electrically conductive metal nanoparticles 102 is approximately 6 nm, 8 nm, 10 nm, 20 nm, 25 nm, or 30 nm, etc.

For example, in still another example, the maximum size of the first surface of each of the electrically conductive metal nanoplates 101 is approximately 120 nm, 135 nm, 150 nm, 160 nm, 180 nm, or 200 nm, etc., and the average diameter of the electrically conductive metal nanoparticles 102 is approximately 24 nm, 30 nm, 35 nm, 40 nm, 50 nm, or 60 nm, etc.

For example, in still another example, the maximum size of the second surface of each of the electrically conductive metal nanoplates 101 is approximately 120 nm, 135 nm, 150 nm, 160 nm, 180 nm, or 200 nm, etc., and the average diameter of the electrically conductive metal nanoparticles 102 is approximately 24 nm, 30 nm, 35 nm, 40 nm, 50 nm, or 60 nm, etc.

For example, a material of the electrically conductive metal nanoplates 101 comprises at least one selected from the group consisting of gold, silver, copper, aluminum and platinum. For example, a material of the electrically conductive metal nanoparticles 102 comprises at least one selected from the group consisting of gold, silver, copper, aluminum and platinum. Because gold and platinum are expensive, their applications are limited. Although copper has a high electrical conductivity and a relatively low cost, its chemical properties are active and the copper is easy to be oxidized, so its application is also limited. Aluminum has a high electrical conductivity and a relatively low cost, but a dense oxide film is formed after the aluminum being oxidized, which affects its electrical conductivity, so its application is also limited. Silver has a strong conductivity, a good chemical stability, a strong antioxidant capacity and a moderate price, even if silver is oxidized, its electrical conductivity is not changed much, it has attracted much attentions in the research of printing ink.

For example, in the electrically conductive material provided by at least one embodiment of the present disclosure, the material of the electrically conductive metal nanoplates is the same as the material of the electrically conductive metal nanoparticles.

For example, a principle of forming the electrically conductive metal nanoparticles is: a metallic precursor is reduced to metal atoms by reducing agent in solution. As the precursor is continuously consumed, concentration of the metal atoms in the reaction system increases. In a case that the concentration of the metal atoms reaches a supersaturation point, the metal atoms aggregate into a small cluster, that is a crystal nucleus. With the continuous growth of the crystal nucleus, the concentration of metal atoms in the reaction system gradually decreases. In a case that the concentration of metal atoms is reduced to a minimum supersaturation point, the crystal nucleus no longer grows. As the precursor continuously supplies metal atoms, the crystal nuclei are gradually aggregated to form metal nanoparticles.

Figure 6:
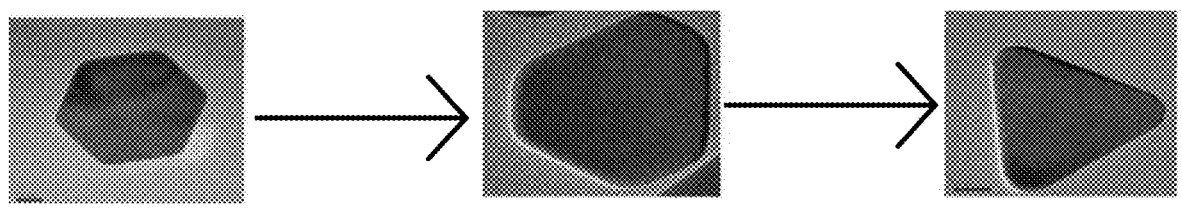
FIG. 6 is a schematic diagram of a growth process of a triangular silver nanoplate provided by at least one embodiment of the present disclosure.

For example, a principle of forming the electrically conductive metal nanoplates is: a surfactant (for example, polyvinylpyrrolidone (PVP)) in the reaction system selectively adheres to a specific crystal face of the crystal nucleus, as a result, a growth rate of the crystal face adsorbed by the surfactant is slower than that of other crystal faces, thus, anisotropic growth is occurred. Based on the principle, morphologies of the metal nanoplates are controlled. For example, FIG. 6 is a schematic diagram of a growth process of a triangular silver nanoplate provided by at least one embodiment of the present disclosure. By the surfactant, silver nanoparticles grow from spherical to a regular hexagonal, an irregular hexagonal, and finally become a triangular silver nanoplate with a regular morphology and a smaller particle size.

Figure 7:
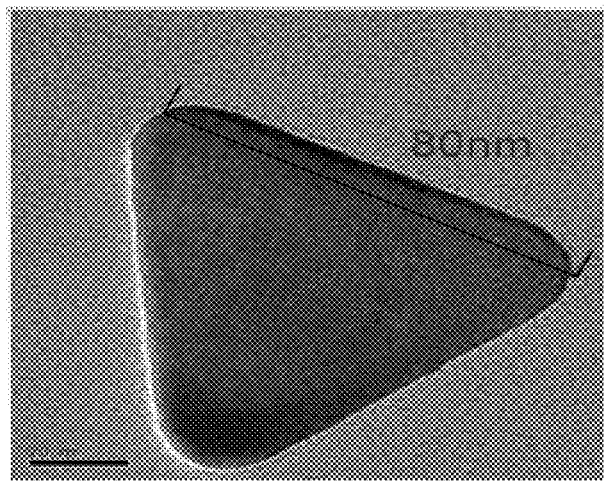
FIG. 7 is a schematic diagram of an enlargement structure of a triangular silver nanoplate provided by at least one embodiment of the present disclosure.

For example, triangular silver nanoplates with a controllable morphology are obtained under a condition that a certain molar ratio of the surfactant and the precursor, a specific reaction temperature and a reaction time. For example, FIG. 7 is a schematic diagram of an enlargement structure of a triangular silver nanoplate provided by at least one embodiment of the present disclosure. As illustrated in FIG. 7, the maximum size of the first surface of each of the triangular silver nanoplates is approximately 80 nm.

It should be noted that, according to different reaction paths, metal nanocrystals with different morphologies are obtained. A single crystal, a single twin-crystal or multiple twin-crystals are formed during the gradual growth of nuclei.

For example, in the electrically conductive material provided by at least one embodiment of the present disclosure, a mass percentage of the electrically conductive metal nanoplates is larger than a mass percentage of the electrically conductive metal nanoparticles. For example, in the electrically conductive material provided by at least one embodiment of the present disclosure, a ratio of the mass percentage of the electrically conductive metal nanoplates to the mass percentage of the electrically conductive metal nanoparticles is from 2:1 to 5:1. For example, in the electrically conductive material, the mass percentage of the electrically conductive metal nanoplates is from 66.7% to 83.3%, and the mass percentage of the electrically conductive metal nanoparticles is from 16.7% to 33.3%.

The following manufacturing method is illustrated by an example that the electrically conductive material is made from silver nanoplates and silver nanoparticles filled in the gaps between the silver nanoplates.

For example, the process of manufacturing the silver nanoparticles comprises: adding a certain amount of polyvinylpyrrolidone (PVP) into deionized water and stirring violently by a magnetic stirrer until the PVP is completely dissolved; adding silver nitrate into the deionized water dissolved with the PVP to form a solution; continue stirring until the solution is colorless and transparent to form solution A; dissolving a certain amount of sodium borohydride in deionized water and stirring violently under the action of the magnetic stirrer until the sodium borohydride is completely dissolved to form solution B; adding the solution B into the previously formed solution A at a certain speed drop by drop, in which the reaction is violent, the color of the solution changes rapidly from colorless to black-yellow, a large number of bubbles are produced; after dropping is completely, the mixture continues to react under violently stirring until the reaction is finished completely and the solution becomes a black suspension; using a slow filter paper to filter reactants to remove large particles and impurities; introducing filtered reactants into a centrifuge tube for centrifugation; after centrifugation, removing the supernatant to obtain the silver nanoparticles; ultrasonically cleansing the silver nanoparticles with ethanol and acetone, centrifuging the cleansed products again; after centrifugation again, drying the products to obtain silver nanoparticles. For example, in the process of forming the silver nanoparticles, silver nitrate ($AgNO_3$) acts as a precursor of the reaction, and sodium borohydride acts as a reducing agent. The silver ions of two valence are reduced to silver by sodium borohydride, and polyvinylpyrrolidone (PVP) is used as a surfactant to disperse the silver nanoparticles.

In an example, the process of manufacturing the silver nanoparticles is: weighing 0.3 g silver nitrate ($AgNO_3$) and 1.5 g polyvinylpyrrolidone (PVP) respectively by a balance; adding 1.5 g PVP into 80 ml deionized water and stirring vigorously by the magnetic stirrer until the PVP is completely dissolved; adding 0.3 g silver nitrate into the deionized water dissolved with the PVP to form a solution; continue stirring until the solution is colorless and transparent to form solution A; dissolving 0.078 g sodium borohydride in 20 ml deionized water and stirring violently by the magnetic stirrer and preventing liquid splashing until the sodium borohydride is completely dissolved to form solution B; adding the solution B into the previously formed solution A at a speed of 2 ml/min drop by drop, in which the reaction is violent, the color of the solution changes rapidly from colorless to black-yellow, a large number of bubbles are produced; after dropping is completed, the mixture continues to react for 10 minutes under violently stirring until the reaction stops completely and the solution becomes a black suspension; using the slow filter paper to filter reactants to remove the large particles and the impurities; introducing filtered reactants into the centrifuge tube for centrifugation, the centrifugal speed is 8000 rpm and the centrifugal time is 20 minutes. After centrifugation, removing the supernatant to obtain the silver nanoparticles; ultrasonically cleansing the silver nanoparticles with ethanol and acetone, centrifuging the cleansed products again; after centrifugation again, drying the products in the drying oven to remove the ethanol, the acetone and the PVP to obtain the silver nanoparticles. For example, an average diameter of the silver nanoparticles is approximately 20 nm.

In another example, the process of manufacturing the silver nanoparticles is: weighing 0.4 g silver nitrate ($AgNO_3$) and 1.6 g polyvinylpyrrolidone (PVP) respectively by a balance; adding 1.6 g PVP into 90 ml deionized water and stirring vigorously by the magnetic stirrer until the PVP is completely dissolved; adding 0.4 g silver nitrate into the deionized water dissolved with the PVP to form a solution;

continue stirring until the solution is colorless and transparent to form solution A; dissolving 0.095 g sodium borohydride in 30 ml deionized water and stirring violently by the magnetic stirrer and preventing liquid splashing until the sodium borohydride is completely dissolved to form solution B; adding the solution B into the previously formed solution A at a speed of 2.5 ml/min drop by drop, in which the reaction is violent, the color of the solution changes rapidly from colorless to black-yellow, a large number of bubbles are produced; after dropping is completed, the mixture continues to react for 20 minutes under violently stirring until the reaction stops completely and the solution becomes a black suspension; using the slow filter paper to filter reactants to remove the large particles and the impurities; introducing filtered reactants into the centrifuge tube for centrifugation, the centrifugal speed is 8000 rpm and the centrifugal time is 20 minutes. After centrifugation, removing the supernatant to obtain the silver nanoparticles; ultrasonically cleansing the silver nanoparticles with ethanol and acetone, centrifuging the cleansed products again; after centrifugation again, drying the products in the drying oven to remove the ethanol, the acetone and the PVP to obtain the silver nanoparticles. For example, an average diameter of the silver nanoparticles is approximately 40 nm.

In yet another example, the process of manufacturing the silver nanoparticles is: weighing 0.2 g silver nitrate ($AgNO_3$) and 1.4 g polyvinylpyrrolidone (PVP) respectively by a balance; adding 1.4 g PVP into 70 ml deionized water and stirring vigorously by the magnetic stirrer until the PVP is completely dissolved; adding 0.2 g silver nitrate into the deionized water dissolved with the PVP to form a solution; continue stirring until the solution is colorless and transparent to form solution A; dissolving 0.65 g sodium borohydride in 15 ml deionized water and stirring violently by the magnetic stirrer and preventing liquid splashing, until the sodium borohydride is completely dissolved to form solution B; adding the solution B into the previously formed solution A at a speed of 2 ml/min drop by drop, in which the reaction is violent, the color of the solution changes rapidly from colorless to black-yellow, a large number of bubbles are produced; after dropping is completed, the mixture continues to react for 15 minutes under violently stirring until the reaction is finished completely and the solution becomes a black suspension; using the slow filter paper to filter reactants to remove the large particles and the impurities; introducing filtered reactants into the centrifuge tube for centrifugation, the centrifugal speed is 7000 rpm and the centrifugal time is 20 minutes. After centrifugation, removing the supernatant to obtain the silver nanoparticles; ultrasonically cleansing the silver nanoparticles with ethanol and acetone, centrifuging the cleansed products again; after centrifugation again, drying the products in an air drying oven to remove the ethanol, the acetone and the PVP to obtain the silver nanoparticles. For example, an average diameter of the silver nanoparticles is approximately 10 nm.

In still another example, the process of manufacturing the silver nanoparticles is: weighing 0.5 g silver nitrate ($AgNO_3$) and 1.8 g polyvinylpyrrolidone (PVP) respectively by a balance; adding 1.8 g PVP into 100 ml deionized water and stirring vigorously by the magnetic stirrer until the PVP is completely dissolved; adding 0.5 g silver nitrate into the deionized water dissolved with the PVP to form a solution; continue stirring until the solution is colorless and transparent to form solution A; dissolving 0.098 g sodium borohydride in 30 ml deionized water and stirring violently by the magnetic stirrer and preventing liquid splashing, until the sodium borohydride is completely dissolved to form solution B; adding the solution B into the previously formed solution A at a speed of 3 ml/min drop by drop, in which the reaction is violent, the color of the solution changes rapidly from colorless to black-yellow, a large number of bubbles are produced; after dropping is completed, the mixture continues to react for 10 minutes under violently stirring until the reaction stops completely and the solution becomes a black suspension; using the slow filter paper to filter reactants to remove the large particles and the impurities; introducing filtered reactants into the centrifuge tube for centrifugation, the centrifugal speed is 9000 rpm and the centrifugal time is 20 minutes. After centrifugation, removing the supernatant to obtain the silver nanoparticles; ultrasonically cleansing the silver nanoparticles with ethanol and acetone, centrifuging the cleansed products again; after centrifugation again, drying the products in an air drying oven to remove the ethanol, the acetone and the PVP to obtain the silver nanoparticles. For example, an average diameter of the silver nanoparticles is approximately 50 nm.

For example, in the above examples, a reduction reaction in which the sodium borohydride acts as a reducing agent is so severe that the polyvinylpyrrolidone (PVP) is adsorbed uniformly on each of the crystal faces of the silver crystal nucleus, such as crystal face (100), crystal face (111), and crystal face (110), so that growth speeds of each of the crystal faces are substantially the same, thus metal silver nanoparticles are formed.

For example, the process of manufacturing the silver nanoplates is: weighing a certain amount of silver nitrate ($AgNO_3$) and a certain amount of polyvinylpyrrolidone (PVP) respectively by a precision balance, adding the PVP into a certain volume of N,N-dimethylformamide (DMF), and stirring uniformly in a magnetic stirrer; adding a certain amount of $AgNO_3$ into the mixture and continue stirring until $AgNO_3$ is completely dissolved, in which the mixture changes from colorless to light yellow and then to reddish brown; transferring the mixture into a high pressure reactor which has a polytetrafluoroethylene (PTFE) liner quickly; keeping the reactor in an oil bath for a few hours with a certain temperature, then removing the reactor and cooling at room temperature; cleansing the product for three times with anhydrous ethanol; storing the silver nanoparticles in ethanol solution after centrifugation. For example, in the process of forming the silver nanoplates, silver nitrate ($AgNO_3$) is used as the precursor of the reaction, silver ions of two valence are reduced to silver by N,N-dimethylformamide (DMF), and polyvinylpyrrolidone (PVP) is used as a surfactant to disperse the silver nanoplates, at the same time, the PVP suppresses each of the silver nanoplates from growing in specific directions.

In an example, the process of manufacturing the silver nanoplates is: weighing 0.17 g silver nitrate ($AgNO_3$) and 1.5 g polyvinylpyrrolidone (PVP) respectively by the precision balance, adding 1.5 g PVP into 20 ml N,N-dimethylformamide (DMF) and stirring uniformly in the magnetic stirrer; adding 0.17 g $AgNO_3$ into the mixture and continue stirring until $AgNO_3$ is completely dissolved, in which the mixture changes from colorless to light yellow and then to reddish brown; transferring the mixture into a high pressure reactor which has a polytetrafluoroethylene (PTFE) liner quickly; keeping the reactor in an oil bath for 45 hours at 160° C., then removing the reactor and cooling at room temperature; cleansing the product for three times with anhydrous ethanol; storing the silver nanoparticles in ethanol solution after centrifugation. For example, the silver nanoplates are triangular silver nanoplates, and the maximum size of the first surface of each of the triangular silver nanoplates is approximately 80 nm.

In another example, the process of manufacturing the silver nanoplates is: weighing 0.19 g silver nitrate ($AgNO_3$) and 1.6 g polyvinylpyrrolidone (PVP) respectively by the precision balance, adding the 1.6 g PVP into 25 ml N,N-dimethylformamide (DMF) and stirring uniformly in the magnetic stirrer: adding 0.19 g $AgNO_3$ into the mixture and continue stirring until $AgNO_3$ is completely dissolved, in which the mixture changes from colorless to light yellow and then to reddish brown; transferring the mixture into a high pressure reactor which has a polytetrafluoroethylene (PTFE) liner quickly; keeping the reactor in an oil bath for 45 hours at 180° C., then removing the reactor and cooling at room temperature; cleansing the product for three times with anhydrous ethanol; storing the silver nanoparticles in ethanol solution after centrifugation. For example, the silver nanoplates are triangular silver nanoplates, and the maximum size of the first surface of each of the triangular silver nanoplates is approximately 120 nm.

In yet another example, the process of manufacturing the silver nanoplates is: weighing 0.15 g silver nitrate ($AgNO_3$) and 1.3 g polyvinylpyrrolidone (PVP) respectively by the precision balance, adding the 1.3 g PVP into 15 ml N,N-dimethylformamide (DMF) and stirring uniformly in the magnetic stirrer; adding 0.15 g $AgNO_3$ into the mixture and continue stirring until $AgNO_3$ is completely dissolved, in which the mixture changes from colorless to light yellow and then to reddish brown; transferring the mixture into a high pressure reactor which has a polytetrafluoroethylene (PTFE) liner quickly; keeping the reactor in an oil bath for 50 hours at 150° C., then removing the reactor and cooling at room temperature; cleansing the product for three times with anhydrous ethanol; storing, the silver nanoparticles in ethanol solution after centrifugation. For example, the silver nanoplates are triangular silver nanoplates, and the maximum size of the first surface of each of the triangular silver nanoplates is approximately 60 nm.

In still another example, the process of manufacturing the silver nanoplates is: weighing 0.21 g silver nitrate ($AgNO_3$) and 1.9 g polyvinylpyrrolidone (PVP) respectively by the precision balance, adding the 1.9 g PVP into 40 ml N,N-dimethylformamide (DMF) and stirring uniformly in the magnetic stirrer; adding 0.21 g $AgNO_3$ into the mixture and continue stirring until $AgNO_3$ is completely dissolved, in which the mixture changes from colorless to light yellow and then to reddish brown; transferring the mixture into a high pressure reactor which has a polytetrafluoroethylene (PTFE) liner quickly; keeping the reactor in an oil bath for 45 hours at 170° C., then removing the reactor and cooling at room temperature; cleansing the product for three times with anhydrous ethanol; storing the silver nanoparticles in ethanol solution after centrifugation. For example, the silver nanoplates are triangular silver nanoplates, and the maximum size of the first surface of each of the triangular silver nanoplates is approximately 180 nm.

In another example, the process of manufacturing the silver nanoplates is: weighing 0.18 g silver nitrate ($AgNO_3$) and 1.5 g polyvinylpyrrolidone (PVP) respectively by the precision balance, adding the 1.5 g PVP into 35 ml N,N-dimethylformamide (DMF) and stirring uniformly in the magnetic stirrer; adding 0.18 g $AgNO_3$ into the mixture and continue stirring until $AgNO_3$ is completely dissolved, in which the mixture changes from colorless to light yellow and then to reddish brown; transferring the mixture into a high pressure reactor which has a polytetrafluoroethylene (PTFE) liner quickly; keeping the reactor in an oil bath for 25 hours at 150° C., then removing the reactor and cooling at room temperature; cleansing the product for three times with anhydrous ethanol; storing the silver nanoparticles in ethanol solution after centrifugation. For example, the silver nanoplates are regular hexagon silver nanoplates, and the maximum size of the first surface of each of the regular hexagon silver nanoplates is approximately 150 nm.

In yet another example, the process of manufacturing the silver nanoplates is: weighing 0.17 g silver nitrate ($AgNO_3$) and 1.6 g polyvinylpyrrolidone (PVP) respectively by the precision balance, adding the 1.6 g PVP into 40 ml N,N-dimethylformamide (DMF) and stirring uniformly in the magnetic stirrer; adding 0.17 g $AgNO_3$ into the mixture and continue stirring until $AgNO_3$ is completely dissolved, in which the mixture changes from colorless to light yellow and then to reddish brown; transferring the mixture into a high pressure reactor which has a polytetrafluoroethylene (PTFE) liner quickly; keeping the reactor in an oil bath for 22 hours at 160° C., then removing the reactor and cooling at room temperature; cleansing the product for three times with anhydrous ethanol; storing the silver nanoparticles in ethanol solution after centrifugation. For example, the silver nanoplates are irregular hexagon silver nanoplates, and the maximum size of the first surface of each of the irregular hexagon silver nanoplates is approximately 200 nm.

For example, in the above examples, the reduction reaction in which the N,N-dimethylformamide (DMF) acting as a reducing agent is not as severe as the reduction reaction in which the sodium borohydride acting as a reducing agent. Under the influence of comprehensive factors of the reaction time, the reaction temperature and the relative content of the surfactant (polyvinylpyrrolidone, (PVP)) in the reaction system, the PVP selectively adheres to specific crystal faces of the crystal nucleus during the reduction reaction. For example, the PVP selectively adheres to the crystal face (100), which causes that the growth rate of the crystal face (100) adsorbed by the surfactant is slower than the growth rate of the crystal face (110) and is slower than the growth rate of the crystal face (111), which results in anisotropic growth and thus metal silver nanoplates are formed.

At least one embodiment of the present disclosure further provides a printing ink, the printing ink comprises any one of the above-mentioned electrically conductive materials and an organic solvent, and the any one of the above-mentioned electrically conductive materials is dispersed in the organic solvent.

For example, in the printing ink, a mass percentage of the electrically conductive material is from 8% to 15%, and a mass percentage of the organic solvent is from 85% to 92%.

For example, the mass percentage of the electrically conductive material is about 8%, and the mass percentage of the organic solvent is about 92%. For another example, the mass percentage of the electrically conductive material is about 10%, and the mass percentage of the organic solvent is about 90%. For still another example, the mass percentage of the electrically conductive material is about 12%, and the mass percentage of the organic solvent is about 88%. For yet another example, the mass percentage of the electrically conductive material is about 15%, and the mass percentage of the organic solvent is about 85%.

For example, the organic solvent comprises ethanol.

For example, the printing ink further comprises a dispersant and an additive. For example, the dispersant comprises polyvinylpyrrolidone, and the additive comprises at least one selected from the group consisting of glycol and glycerol.

For example, the dispersant disperses the electrically conductive materials in organic solvents uniformly, and the additive makes compatibility between the electrically conductive materials and the organic solvent better.

Figure 8:
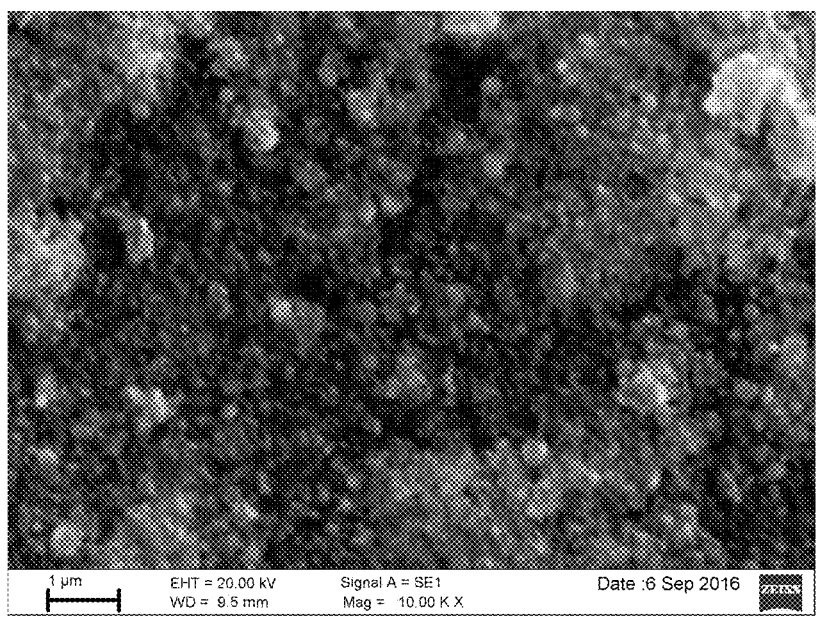
FIG. 8 is a scanning electron microscope diagram of the printing ink in FIG. 3 after being sintered.

For example, FIG. 8 is a scanning electron microscope diagram of the printing ink in FIG. 3 after being sintered. As illustrated in FIG. 8, the printing ink formed by mixing the silver nanoplates with the silver nanoparticles has a smooth surface and a regular morphology after the printing ink is sintered, and the silver nanoplates are tightly bonded with the silver nanoparticles without gaps or cracks.

At least one embodiment of the present disclosure further provides a method for manufacturing the printing ink, and the manufacturing method comprises: dispersing any one of the above-mentioned electrical conductive materials in the organic solvent.

For example, the process of manufacturing a mixed type printing ink made from the silver nanoparticles and the silver nanoplates comprises: using ethanol as a solvent, using polyvinylpyrrolidone (PVP) as a dispersant, adding glycol and glycerol as additives at the same time, adjusting viscosity of the printing ink, then adding the dried silver nanoplates and silver nanoparticles into the solvent mixed with additives in a specific proportion, stirring the silver nanoplates and the silver nanoparticles evenly, ultrasonic dispersing for 1 hour to obtain the printing ink that the silver nanoplates and the silver nanoparticles are dispersed uniformly. In the printing ink, the mass percentage of the ethanol is approximately 45%, the mass percentage of the ethylene glycol is approximately 35%, and the mass percentage of the glycerol is approximately 10%, and a sum of the mass percentage of the electrically conductive metal nanoplates and the mass percentage of the electrically conductive metal nanoparticles is approximately 10%. The ratio of the mass percentage of the electrically conductive metal nanoplates to the mass percentage of the electrically conductive metal nanoparticles is approximately 2:1.

In another example, in the printing ink, the mass percentage of the ethanol is approximately 45%, the mass percentage of the ethylene glycol is approximately 30%, and the mass percentage of the glycerol is approximately 10%, and the sum of the mass percentage of the electrically conductive metal nanoplates and the electrically conductive metal nanoparticles is approximately 10%. The ratio of the mass percentage of the electrically conductive metal nanoplates to the mass percentage of the electrically conductive metal nanoparticles is approximately 3:1.

In still another example, in the printing ink, the mass percentage of the ethanol is approximately 40%, the mass percentage of the ethylene glycol is approximately 30%, the mass percentage of the glycerol is approximately 10%, and the sum of the mass percentage of the electrically conductive metal nanoplates and the mass percentage of the electrically conductive metal nanoparticles is approximately 20%. The ratio of the mass percentage of the electrically conductive metal nanoplates to the mass percentage of the electrically conductive metal nanoparticles is approximately 4:1.

In yet another example, in the printing ink, the mass percentage of the ethanol is approximately 40%, the mass percentage of the ethylene glycol is approximately 30%, and the mass percentage of the glycerol is approximately 10%, and the sum of the mass percentage of the electrically conductive metal nanoplates and the mass percentage of the electrically conductive metal nanoparticles is approximately 20%. The ratio of the mass percentage of the electrically conductive metal nanoplates to the mass percentage of the electrically conductive metal nanoparticles is approximately 5:1.

At least one embodiment of the present disclosure further provides a method for manufacturing an electrically conductive structure, and the manufacturing method comprises: providing a base substrate; and forming any one of the above-mentioned printing inks on the base substrate by an inkjet printing method to form the electrically conductive structure.

The manufacturing method of the electrically conductive structure further comprises: drying the printing ink. For example, the drying process includes natural drying or sintering in an oven at a certain temperature. For example, the sintering temperature is from 40° C. to 70° C., for example, approximately 40° C., 50° C., 60° C., or 70° C.

For example, the electrically conductive structure is an electrode or a circuit line.

The electrically conductive material, the printing ink and the method for manufacturing an electrically conductive structure provided by at least one embodiment of the present disclosure have at least one of beneficial effects as follows:

(1) in the electrically conductive material provided by at least one embodiment of the present disclosure, because the electrically conductive metal nanoplates have relatively good electrical conductivities and the electrically conductive metal nanoplates are not prone to agglomerate, in this way, a compact structure can be obtained by using the electrically conductive metal nanoplates as frameworks and filling the electrically conductive metal nanoparticles in gaps between the electrically conductive metal nanoplates, thus, the electrically conductivity of the electrically conductive material is increased.

(2) in the manufacture method of the printing ink provided by at least one embodiment of the present disclosure, the manufacturing process requires a low requirement for equipment, the manufacturing process is simple and the production cost is low.

Please note that:

(1) the drawings of the embodiments of the present disclosure are only related to the structures mentioned in the embodiments of the present disclosure, and other structures can be obtained by general designs;

(2) for the sake of clarity, sizes of layers or regions in the drawings for describing the embodiments of the present disclosure are not drawn according to an actual scale but are exaggerated or diminished, it is understood that in a case that elements such as layers, membranes, regions, or substrates are referred to as being located "up" or "down" on another element, the element may be "directly" located "up" or "down" on another element, or intermediate elements may exist; and (3) the embodiments of the present disclosure and the features therein can be combined with each other in the absence of conflict.

What is described above is related to only the illustrative embodiments of the disclosure and not limitative to the scope of the disclosure. The scopes of the disclosure are defined by the accompanying claims.

What is claimed is:

1. An electrically conductive material, comprising:
   a plurality of electrically conductive metal nanoplates; and
   electrically conductive metal nanoparticles filled in gaps between the plurality of the electrically conductive metal nanoplates, wherein each of the electrically conductive metal nanoplates comprises a first surface and a second surface opposite to each other, and a minimum distance between the first surface and the second surface is at a nanometer scale;

wherein the first surface of each of the electrically, conductive metal nanoplates has a first size along a first direction and a second size along a second direction, the first direction is different from the second direction, and both the first size and the second size are more than three times the minimum distance; and wherein the second surface of each of the electrically conductive metal nanoplates has a third size along a third direction and a fourth size along a fourth direction, the third direction is different from the fourth direction, and both the third size and the fourth size are more than three times the minimum distance.

2. The electrically conductive material according to claim 1, wherein a size of each of the electrically conductive metal nanoparticles in any direction is at a nanometer scale.

3. The electrically conductive material according to claim 1, wherein a shape of each of the electrically conductive metal nanoplates comprises an irregular polygon.

4. The electrically conductive material according to claim 1, wherein a shape of each of the electrically conductive metal nanoplates comprises at least one selected from the group consisting of a triangle, a quadrilateral, a pentagon and a hexagon.

5. The electrically conductive material according to claim 1, wherein a maximum size of the first surface of each of the electrically conductive metal nanoplates is from 3 times to 5 times an average diameter of the electrically conductive metal nanoparticles.

6. The electrically conductive material according to claim 5, wherein a maximum size of the second surface of each of the electrically conductive metal nanoplates is from 3 times to 5 times an average diameter of the electrically conductive metal nanoparticles.

7. The electrically conductive material according to claim 1, wherein a maximum size of the second surface of each of the electrically conductive metal nanoplates is from 3 times to 5 times an average diameter of the electrically conductive metal nanoparticles.

8. The electrically conductive material according to claim 1, wherein a material of the electrically conductive metal nanoplates comprises at least one selected from the group consisting of gold, silver, copper, aluminum and platinum, and a material of the electrically conductive metal nanoparticles comprise at least one selected from the group consisting of gold, silver, copper, aluminum and platinum.

9. The electrically conductive material according to claim 8, wherein the material of the electrically conductive metal nanoplates is the same as the material of the electrically conductive metal nanoparticles.

10. The electrically conductive material according to claim 1, wherein a mass percentage of the electrically conductive metal nanoplates is larger than a mass percentage of the electrically conductive metal nanoparticles.

11. The electrically conductive material according to claim 1, wherein a material of the electrically conductive metal nanoplates comprises at least one selected from the group consisting of gold, silver, copper, aluminum and platinum, and a material of the electrically conductive metal nanoparticles comprise at least one selected from the group consisting of gold, silver, copper, aluminum and platinum.

12. The electrically conductive material according to claim 1, wherein a mass percentage of the electrically conductive metal nanoplates is larger than a mass percentage of the electrically conductive metal nanoparticles.

13. A printing ink, comprising:
the electrically conductive material according to claim 1 and an organic solvent, wherein the electrically conductive material is dispersed in the organic solvent.

14. The printing ink according to claim 13, wherein a mass percentage of the electrically conductive material is from about 8% to about 15%, and a mass percentage of the organic solvent is from about 85% to about 92%.

15. The printing ink according to claim 14, further comprising a dispersant and an additive.

16. The printing ink according to claim 15, wherein the organic solvent comprises ethanol, the dispersant comprises polyvinylpyrrolidone, and the additive comprises at least one selected from the group consisting of glycol and glycerol.

17. The printing ink according to claim 13, wherein:
each of the electrically conductive metal nanoplates comprises a first surface and a second surface opposite to each other, and a minimum distance between the first surface and the second surface is at a nanometer scale;
the first surface of each of the electrically conductive metal nanoplates has a first size along a first direction and a second size along a second direction, the first direction is different from the second direction, and both the first size and the second size are more than three times the minimum distance; and
the second surface of each of the electrically conductive metal nanoplates has a third size along a third direction and a fourth size along a fourth direction, the third direction is different from the fourth direction, and both the third size and the fourth size are more than three times the minimum distance.

18. A method for manufacturing an electrically conductive structure, comprising:
providing a base substrate; and
forming the printing ink according to claim 13 on the base substrate by an inkjet printing method to form the electrically conductive structure.

19. The manufacturing method according to claim 18, further comprising: drying the printing ink.

* * * * *